United States Patent [19]
Doherty et al.

[11] Patent Number: 5,560,033
[45] Date of Patent: Sep. 24, 1996

[54] SYSTEM FOR PROVIDING AUTOMATIC POWER CONTROL FOR HIGHLY AVAILABLE N+K PROCESSORS

[75] Inventors: Brian P. Doherty, Lisle; Douglas A. Kimber, Batavia; Mikiel L. Larson, St Charles; John H. Pokropinski, Woodridge, all of Ill.

[73] Assignee: Lucent Technologies Inc., Murray Hill, N.J.

[21] Appl. No.: 297,458

[22] Filed: Aug. 29, 1994

[51] Int. Cl.[6] ............................................. G06F 11/20
[52] U.S. Cl. ................. 395/800; 395/185.04; 395/750; 395/200.11; 364/DIG. 1; 364/267; 364/267.3; 364/267.9; 364/273.4
[58] Field of Search ........................... 395/ 0, 575, 181, 395/182.02, 182.06, 182, 21.22, 800, 750, 185.09, 182.20, 200.11; 371/11.1, 14, 16.3

[56] References Cited

U.S. PATENT DOCUMENTS

| | | | |
|---|---|---|---|
| 4,263,647 | 4/1981 | Merrell et al. | 371/48 |
| 4,710,926 | 12/1987 | Brown et al. | 371/9 |
| 5,008,805 | 4/1991 | Fiebig et al. | 364/187 |
| 5,129,080 | 7/1992 | Smith | 395/575 |
| 5,153,909 | 10/1992 | Beckle et al. | 379/265 |
| 5,239,575 | 8/1993 | White et al. | 379/107 |
| 5,440,726 | 8/1995 | Fuchs et al. | 395/82.18 |
| 5,448,723 | 9/1995 | Rowett | 395/200.02 |

*Primary Examiner*—Mehmet B. Geckil
*Attorney, Agent, or Firm*—Michael B. Johannesen

[57] ABSTRACT

A highly available processor complex that can use industry standard hardware and software through use of an N+K sparing arrangement with a separate monitor ("watchdog") processor. The watchdog processor monitors periodic "heartbeat" messages from the monitored elements and can change activity and status of such monitored elements through control messages. Further, the watchdog processor is operatively connected to a power control circuit that controls the power to the monitored elements. Thus, the watchdog processor can guarantee that a faulty element can be rendered non-functional and can also totally restart an element through power cycling it.

2 Claims, 5 Drawing Sheets

SYSTEM FOR PROVIDING AUTOMATIC POWER CONTROL FOR HIGHLY AVAILABLE N+K PROCESSORS

TECHNICAL FIELD

This invention relates to the area of highly available processors, and, more specifically to an N+K processor sparing arrangement wherein all N+K processors are under the control of a watchdog processor.

BACKGROUND OF THE INVENTION

Highly available processors are required in system-critical applications; that is, applications such as telephone switching offices, air traffic control, nuclear power plants and the like, where system outages cause significant problems. Many types of highly available processing systems have been proposed or are currently in use in such applications. These systems include active-standby (or active-active) pairing, N+K sparing, and N module redundant (NMR) processors operating in synchronization (that is, all processors are operating on the same instruction at the same time). Such systems, however, all have well known drawbacks.

Primarily, all of these systems require proprietary hardware and/or software. Such proprietary hardware and software make these systems far more expensive than using industry standard hardware and software. Further, such proprietary hardware and software lock the user into a specific manufacturer's hardware and/or software and the user is then at the mercy of the manufacturer to keep the technology up to date. Many of these systems are also known to not meet claims of availability, because such systems have to generally be brought down (that is, turned off) for fixes and systems updates.

Therefore, a problem in the art is that there is no simple and reliable system for providing highly available processors using industry standard hardware and software.

SUMMARY OF THE INVENTION

This problem is solved and a technical advance is achieved in the art by a highly available processor that can use industry standard hardware and software through use of an N+K sparing arrangement with a separate monitor ("watchdog") processor. The watchdog processor monitors periodic "heartbeat" messages from monitored elements and can change activity and status of such monitored processors through control messages. Such elements may be processors or other operational devices, such as I/O circuits. Further, the watchdog processor is operatively connected to a power control circuit that controls the power to the monitored elements. Thus, the watchdog processor can guarantee that a faulty element can be rendered non-functional and can also totally restart an element through power cycling it.

A watchdog processor according to this invention is advantageously applied to an N+K sparing arrangement where there are N operational elements and K spare elements. In such arrangements, the N elements are assigned to a plurality of separate task groups, wherein all of the elements in each group perform approximately the same task (but not necessarily in synchronization with each other). The watchdog processor then controls the configuration of all elements and moves elements into and out of groups as needed. Further, the watchdog processor monitors each of the elements in each group, advantageously through heartbeat messages, and takes corrective action according to any faults reported in messages or non-receipt of the message. Advantageously, such corrective action can be escalated from minimal actions, such as sending messages requesting action be taken at the monitored element, up through power cycling and ultimately removing the element from service by turning off the power to the element. By such intervention, the watchdog element can guarantee that no faulty processor will continue to cause problems in a system.

BRIEF DESCRIPTION OF THE DRAWINGS

A more complete understanding of this invention may be obtained from a consideration of the following description in conjunction with the drawings, in which.

DETAILED DESCRIPTION

Figure 1:
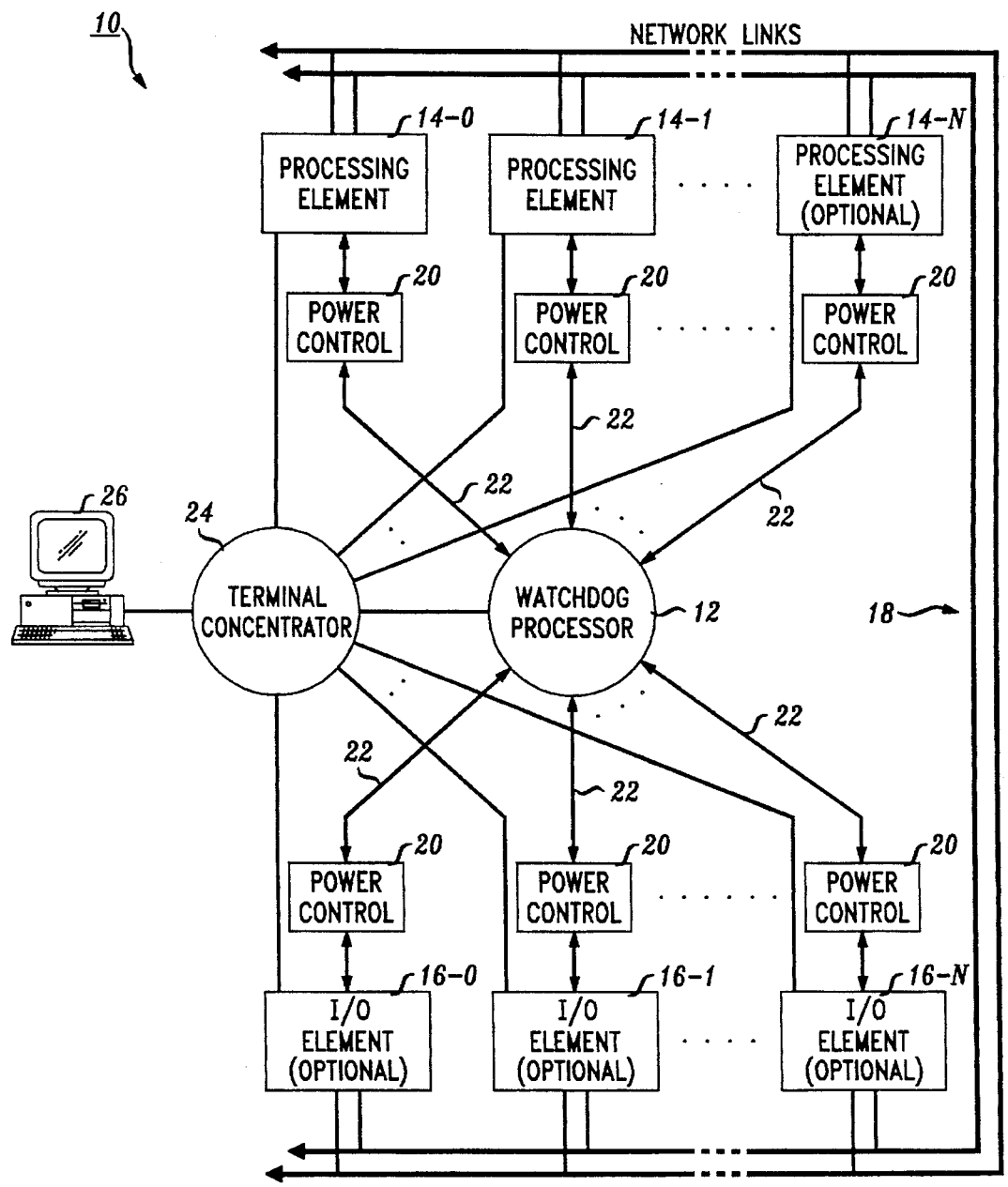
FIG. 1 is a block diagram of an illustrative system architecture in which a watchdog processor according to the exemplary embodiment of this invention monitors a plurality of processing and I/O elements.

FIG. 1 is a block diagram of an illustrative embodiment of this invention in the context of a system architecture 10, wherein a watchdog processor 12 is monitoring a plurality of processor elements 14-0 through 14-N and input/output (I/O) elements 16-0 through 16-N. Processing elements 14-0 through 14-N and I/O elements 16-0 through 16-N are organized into an N+K sparing arrangement wherein "N" elements are actively operating and "K" elements are in a standby or warm spare mode. Processor elements 14-X and I/O elements 16-X are all linked via duplex network links 18 to each other and to other network elements (not shown). Network links 18 could be, for example, an Ethernet or other industry standard network, or an industry standard backplane such as VMI or FutureBus+.

Each processor 14-X and I/O element 16-X has connected to it a power control circuit 20. Power control circuit 20 connects such elements to individual or to a common power supply as is known in the art. Power control circuit 20 is connected to watchdog process via a bus 22. Bus 22 may be, advantageously, an EIA 232 bus (commonly known as an "RS-232" bus), as is known in the art.

A terminal concentrator 24 is connected to each processing element 14-X, I/O element 16-X and watchdog 12 in order to provide an interface between such processors and human machine interface 26. Human machine interface 26 such as a personal computer provides manual control of all of the elements in the system and provides the system administrator with configuration information and other system information as is known in the art.

Watchdog processor 12 monitors elements in this exemplary embodiment by receiving heartbeat messages from processor elements 14-X and I/O elements 16-X over buses 22. Heartbeat messages, as known in the art, comprise periodic messages sent from the monitored element to the monitoring processor. The monitoring processor sets a timer after each message, and the next message should be received before the timer expires. If a heartbeat message is not received during the time period, the monitoring processor presumes that the monitored element is no longer functional, and takes corrective action. Heartbeat messages are well known in the art and described in Baron, et al., U.S. Pat. No. 4,635,187, which issued Jan. 6, 1987, and assigned to the assignee of the current invention.

In this exemplary embodiment of heartbeat messages, if watchdog processor 12 does not receive a heartbeat message from, for example, processing element 14-1 during a predetermined period of time, then watchdog processor 12 sends a control message over bus 22 (via power control 20) to processing element 14-1. This control message may be to cause a reinitialization of the process that sends heartbeat messages or take other action. Watchdog processor 12 then sets a timer during which it expects a response message from processing element 14-1. If such message is not received within the predetermined period of time, then watchdog processor 12 escalates its action. Such escalation may include causing power control 20 to turn off the power to processing element 14-1 and, after a predetermined period of time, turn the power back on, thus causing processing element 14-1 to reboot.

Again after a further predetermined period of time, watchdog processor 12 should receive heartbeat messages from processing element 14-1. If such messages are not received or alternatively, if processing element goes through a series of these reboots within another period of time (which could be over a course of hours or days) watchdog processor 12 may cause power control 20 to totally isolate processing element 14-1 from the network by turning it off completely.

In the meantime, watchdog processor 12 may cause a reconfiguration of the network by causing another processing element, for example, processing element 14-N, to take over the tasks of processing element 14-1 while that processor is being restored. Backing up of tasks is well known in the art, and, thus, is not described further.

Figure 2:
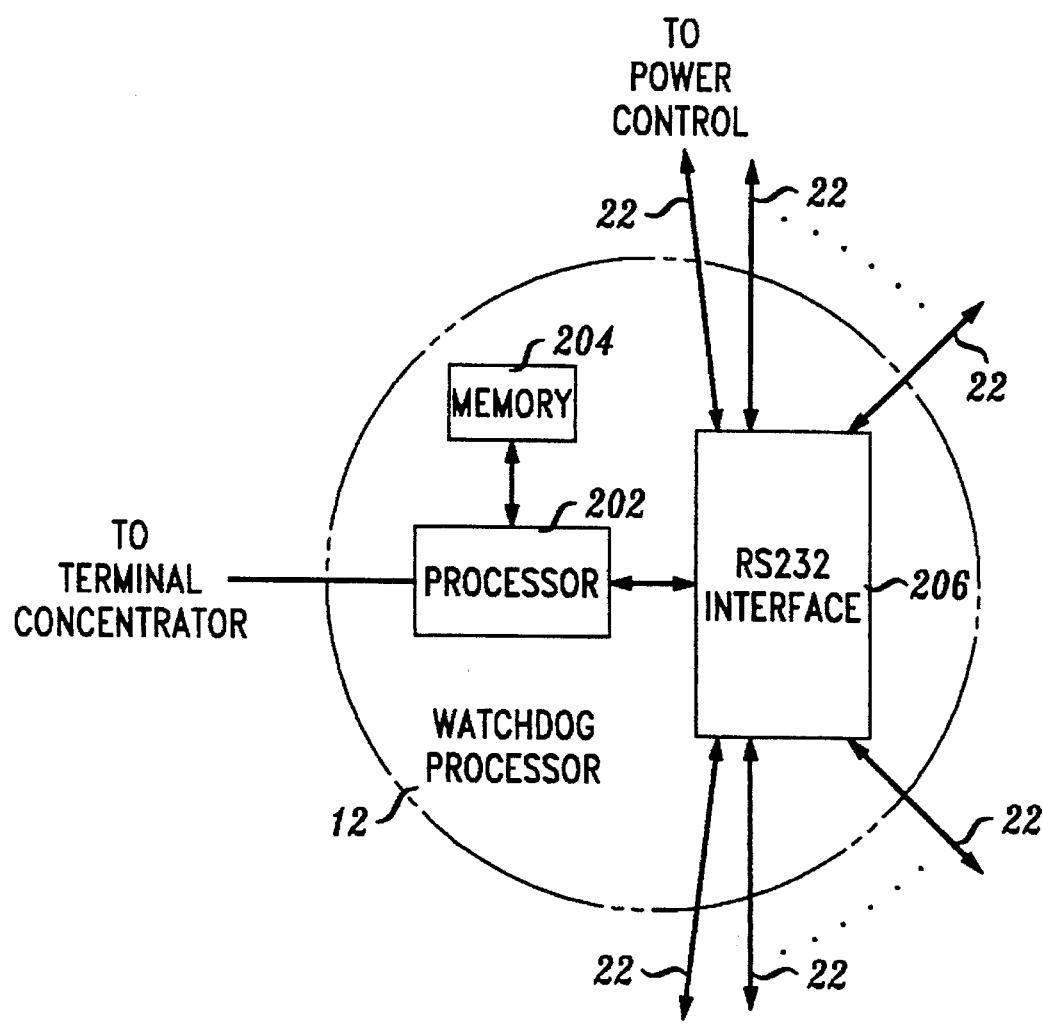
FIG. 2 is a block diagram of the power control circuit of FIG. 1.

Turning now to FIG. 2, a watchdog processor according to an exemplary embodiment of this invention is shown. Watchdog processor 12 comprises a microprocessor 202 connected to memory system 204 and to an EIA-232 interface circuit 206. In a preferred embodiment of this invention, watchdog processor 12 comprises a Motorola 68300 series processor, which provides processor 202 and at least part of memory 204 on one chip. Other RAM and ROM devices may be used as necessary. For example, the operational software of the watchdog processor is stored in EPROM. Additionally, several EIA-232 ports are also provided on the same processor chip. Also, in this exemplary embodiment, EIA-232 interface circuit comprises two SCC2698B chips manufactured by Philips. Such devices are industry standard in keeping with the goal of this invention; that is, to provide hardware that is easily upgradable while maintaining system integrity. Processor 202 uses memory 204 to store operational software and maintain state data on the monitored elements.

Figure 3:
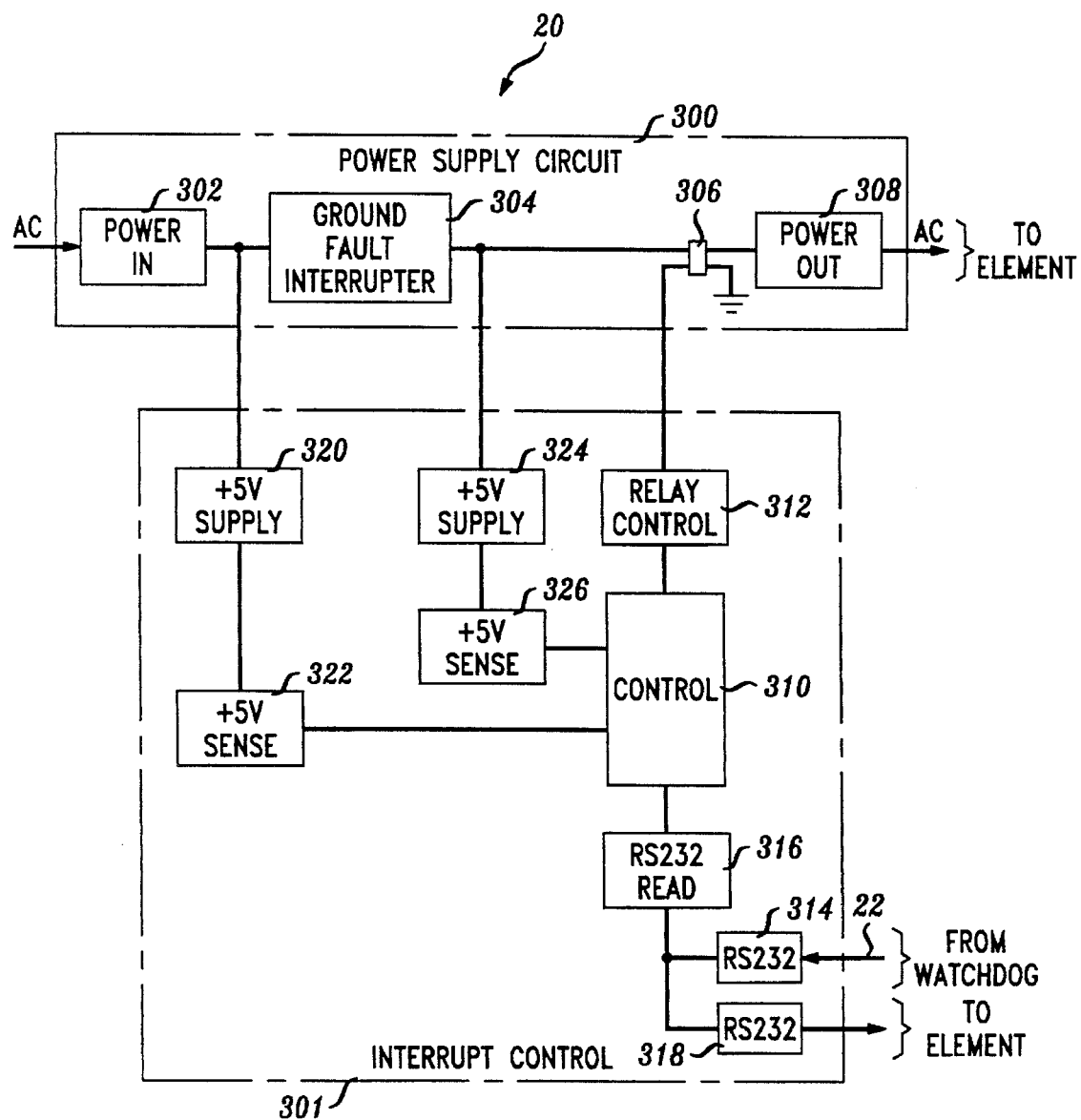
FIG. 3 is a block diagram of the watchdog processor of FIG. 1.

FIG. 3 is a block diagram of a power control device according to an exemplary embodiment of this invention. Power control device 20 comprises an AC control circuit and an AC interrupt control circuit 301. AC current enters at an AC socket or AC power plug 302. AC then continues through a ground fault interrupter 304. As is known in the art, ground fault interrupter 304 interrupts the flow of AC power when there is a fault in the connected circuitry that causes a current in the safety ground or a mismatch in the current in the power and neutral leads of the power. AC power continues through relay 306 which is operable by interruption control circuit 301, as will be described further below. Power then continues through power out device 308, which in the preferred embodiment may be an AC outlet. Power then continues to the element being monitored. AC control circuit 300 may also be used for controlling any form of DC voltage as well.

Interrupt control circuit 301 comprises controller 310, which in this preferred embodiment is an INTEL 8051 processor. Controller 310 is operatively connected to relay control 312, which controls the opening and closing of relay 306, thus having the capability of turning on and off the AC power provided by the power control circuit 300. Controller 310 receives messages over bus 22 from the watchdog processor through EIA-232 connector 314. Messages are passed through EIA-232, interface 316, and then to controller 310. All messages are also forwarded through EIA-232, connector 318 to the element. All messages from the element are passed from connector 318 to connector 314 without being monitored. In the exemplary embodiment of this invention, controller 310 merely reads messages going across the EIA-232 bus. One skilled in the art can easily see that controller 310 may also send messages on the bus with minor modifications. Controller 310 monitors the bus for messages that begin with a control character in this exemplary embodiment. All other messages are ignored. Certain control characters, i.e., control A, control B, etc., may be used to cause controller 310 to operate relay control 312, to open or close relay 306.

Further, controller 310 monitors ground fault interrupter 304 to sense when it is in its open or interrupt condition. To this end, +5 V power supply 320 is connected to the AC line between connector 302 and the ground fault interrupter 304. +5 V supply 320 is connected to +5 V sense 322, which senses whether there is a +5 V power coming from supply 320. +5 V sense is connected to controller 310 to deliver an indication that there is AC power at the input to ground fault interrupter 304. In addition, the power control device 20 and interrupt control unit 301 are powered by the +5 V supply 320. +5 V power supply 324 is connected to AC circuit 300 after ground fault interrupter 304. The output of +5 V supply 324 is connected to +5 V sensor 326, which determines whether there is power after ground fault interrupter 304. +5 V sense 326 delivers the information as to whether or not there is power after ground fault interrupter 304 to controller 310. In this manner, controller 310 can make the determination whether ground fault interrupter has been tripped and may then operate relay control 312 and open or close relay 306. Further, controller 310 may cause an indication such as a lamp to change to denote such interrupted condition or take other action. Controller 310 may then monitor bus 22 for a command to reconnect the power supply after the fault condition has been remedied.

Figure 4:
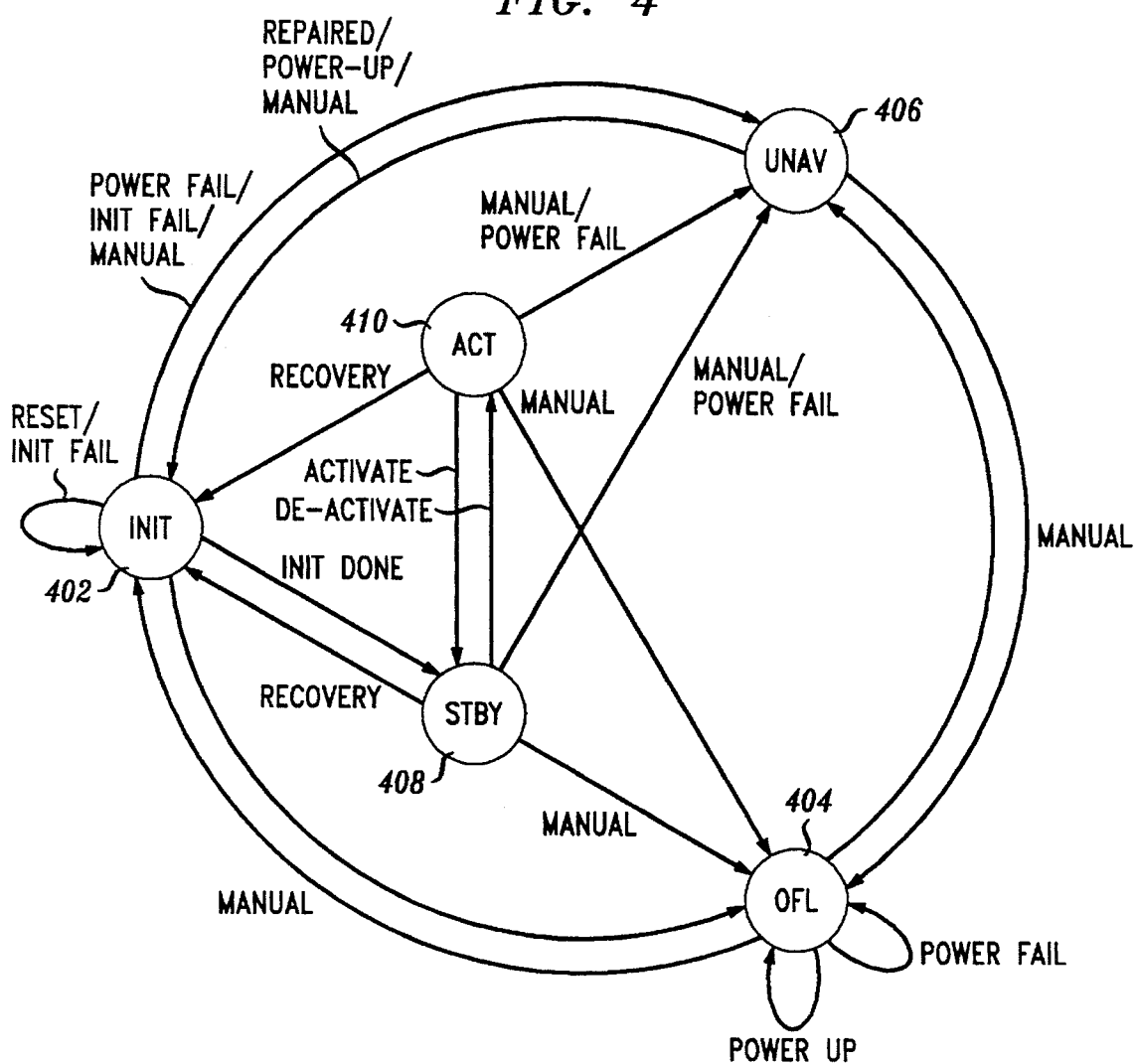
FIG. 4 is a state diagram of the state transitions as taken place in the watchdog processor of FIG. 2.

Turning now to FIG. 4, a state table is shown, as used by watchdog processor to monitor the state of the monitored elements. For each element in system architecture 10 (that is, processor elements 14 and I/O elements 16) there is one state machine kept in watchdog processor memory 204 (FIG. 2). There are five valid states in this exemplary embodiment that these elements may be in. The first state 402 is the INIT or initialization state, where that network element is initializing. This is the first state the processor will be in when it is powered-up. There are four transitions out of initialization state 402. First, there is a manual transition from the initialization state to the off-line state 404. This transition may only be made by commands from human machine interface 26 (FIG. 1 ). A second transition is through RESET/INIT FAIL which causes a transition back to the initialization state. A third transition is a power failure/initialization failure or manual action changing the state from initialization to unavailable 406. Such transition means that the network element is not available for any processing and is, in fact, not powered. If the processor initializes normally, it will transition from the initialization state 402 to standby state 408.

In standby state 408, the element is ready and waiting to participate in any application assigned to it by other elements of the system. There are four transitions out of standby state 408. A first transition is through manual action to the off-line state 404. A second transition occurs through either manual action or through a power failure from standby state 408 to unavailable state 406. If, for whatever reason, the element has a fault, a transition may be made from standby state 408 to initialization 402. This may occur, for example, if the watchdog did not receive a heartbeat message from the element during an appropriate time period. Finally, the element may transition from standby 408 to active 410.

In active state 410, the element is participating in the application. This means that the element is performing actual processing according to its functionality and its assigned tasks. There are four transitions from the active state. A first transition is through manual action from active state 410 to off-line state 404. A second transition occurs from active state 410 to unavailable state 406 through a manual action or through a power failure. A third transition may occur from the active state 410 to standby state 408 through action of the watchdog or through manual action via the watchdog if, for example, that particular task or functionality of the network element is no longer required. A final transition from active state 410 may be back to the initialization state 402 for recovery purposes if, for example, the watchdog processor detected no heartbeat message during the predetermined time period.

Offline state 402 may be entered through manual action at any input device with proper permission, such as maintenance terminal 26 (FIG. 1 ). In offline state 404, the element may or may not have power. This is primarily a maintenance state, where diagnostics or other tests may be run. There are four transitions from offline state 404, all of which are also manual actions. The element may transition to the unavailable state 406 or to initialization state 402 by manual action. Additionally, the element may remain in offline state 404 and transition back to the offline state 404 through a power failure or through power up for running, for example, diagnostics or other maintenance programs.

In unavailable state 406, the element is powered down due to one or more faults or manual request. This state may be reached by manual or automatic action. There are two transitions out of unavailable state 406, through manual action. One transition to initialization state 402 is an indication that this element is being repaired and powered up. The second is to the offline state 404, for testing purposes.

Figure 5:
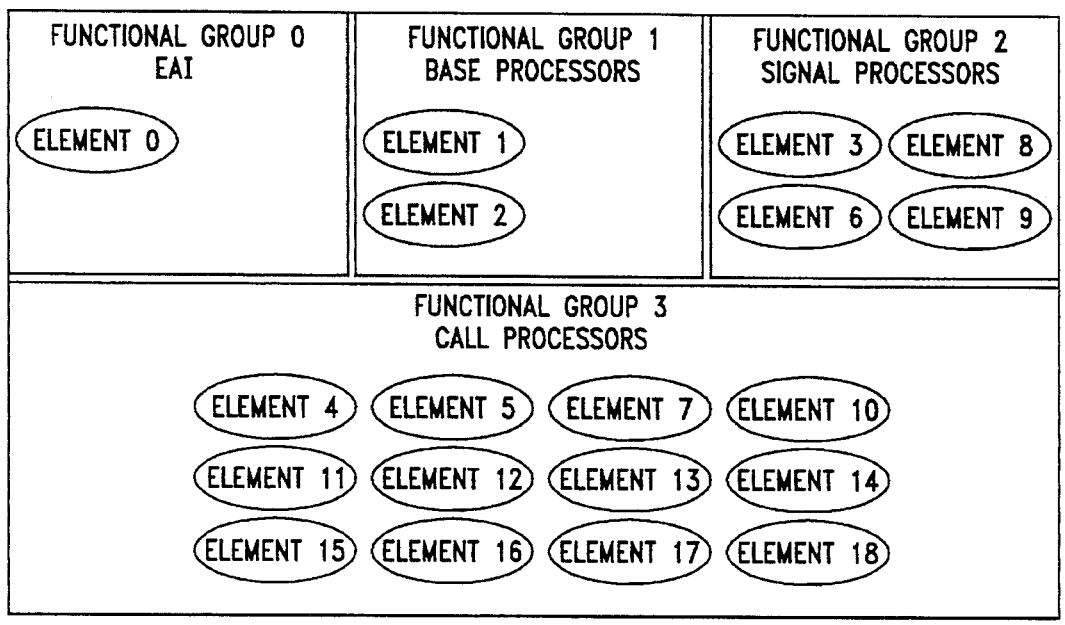
FIG. 5 is an exemplary grouping of processors as illustrated in FIG. 1 according to an exemplary organization in the watchdog processor of FIG. 2.

An exemplary system architecture will now be described in connection with FIG. 5 illustrating how a watchdog processor may be used in an N+K sparing arrangement to provide a flexible system architecture, where N is the number of elements actively providing service and K is the number of spare elements. In this exemplary embodiment, there are four groups numbered 0 through 3. Group 0 is an element that is responsive to the emergency action interface (EAI) which is the processor that controls the maintenance terminal, etc. There is normally one element in this group and this element is generally considered permanent in that there is a minimum of 1, a maximum of 1 and it is a required element.

Group 1 comprises the base processors. Base processors perform administrative and operational application tasks. In this group, there are illustrated two elements. This configuration may include a minimum of one element in the active state, a maximum of one element in the active state, therefore, there is one spare element in this group. This is a special group in that at least one processor must be active in this group at all times. On system powerup, the watchdog assumes the presence of only this group, and this group is responsible for configuring the watchdog to recognize the other groups.

Group 2 comprises signal processors. These processors perform signaling functionality. In this illustrative embodiment, there must be at least two process elements active at all times, with the maximum of three. In the illustrated configuration, there are four elements in group 2, thus there is one spare.

Finally in group 3, there are 12 processors performing call processing functionality. In this group, there is required to be at least five active processors, with a maximum of 10, thus, at any given time, there are two minimum spare processors in this group. For every group in the system, the watchdog will attempt to obtain the largest number of elements it can to participate in the application, without exceeding the maximum number allowed. If a group falls below the minimum, the watchdog attempts to fix this state, and activates alarms if it cannot.

It is to be understood that the above-described embodiment is merely illustrative of the principles of this invention, and that many variations may be devised by those skilled in the art without departing from the scope of the invention. It is, therefore, intended that such variations be included within the scope of the claims.

We claim:

1. An N+K sparing processing arrangement comprising:
   a watchdog processor;
   a plurality of processors connected to said watchdog processor for message communication, each of said plurality of processors sending periodic messages to said watchdog processor, said plurality of processors being configured into processing groups by said watchdog processor, each of said processing groups including one or more active processors and one or more spare processors, each processor in each group performing a similar task, and each group performing different tasks for the other groups; and
   a plurality of power control circuits connected to each of said plurality of processors and each of said plurality of power control circuits communicating with said watchdog processor; said watchdog processor reconfiguring said processing groups and taking corrective action in response to receipt or non-receipt of said periodic messages from said plurality of processors, said corrective action including causing said power control circuits to remove power from one or more of said plurality of processors.

2. An N+K sparing arrangement according to claim 1 further including a human-machine interface for causing said watchdog processor to change the configuration of said processing groups.

\* \* \* \* \*